US 6,739,847 B1

(12) United States Patent
Tarng et al.

(10) Patent No.: US 6,739,847 B1
(45) Date of Patent: May 25, 2004

(54) STRUCTURE OF CHECK VALVE WITH SILENCING COVER

(75) Inventors: Guang-Der Tarng, Taoyuan Hsien (TW); Lung-Tsai Chang, Taoyuan Hsien (TW); Chung-Pen Chiu, Taoyuan Hsien (TW)

(73) Assignee: Rechi Precision Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/326,137

(22) Filed: Dec. 23, 2002

(51) Int. Cl.7 ............. F01C 1/04; F01C 21/00; F16K 15/02
(52) U.S. Cl. .............. 418/55.1; 418/270; 137/529
(58) Field of Search ............... 418/55.1, 270; 137/529

(56) References Cited

U.S. PATENT DOCUMENTS 3,862,751 A * 1/1975 Schwaller .................. 137/529
5,494,422 A * 2/1996 Ukai et al. ................. 418/55.1
6,132,191 A * 10/2000 Hugenroth et al. ........ 418/55.1
6,227,830 B1 * 5/2001 Fields et al. ............... 418/55.1

FOREIGN PATENT DOCUMENTS

JP          1-130082       * 5/1989 ............ 418/55.1

* cited by examiner

Primary Examiner—John J. Vrablik
(74) Attorney, Agent, or Firm—Troxell Law Office PLLC

(57) ABSTRACT

The present invention mainly includes a valve cock and a valve cock cover to form a structure of check valve, of which a trepan boring is set on the cover to accommodate the valve cock, and a pressure guide hole is set on the cover body to connect the high-pressure and valve cock trepan boring. A blast groove is set on the binding surface of the valve cock cover and shielding seat to release refrigerant. The valve cock is pressed against the vent hole of the shielding seat under the effect of the high-pressure chamber, and then the high-pressure refrigerant is blocked from flowing back into the low-pressure chamber. However, the high-pressure refrigerant will directly eject upward against the valve cock when the rotating turbine and fixed whirl run mutually, in addition the high-pressure refrigerant will flow into the high-pressure chamber via the blast groove.

6 Claims, 6 Drawing Sheets

STRUCTURE OF CHECK VALVE WITH SILENCING COVER

BACKGROUND OF THE INVENTION

1. Field of the Invention

The present invention relates to a check valve providing an effective structure to reduce abnormal voice caused by the impulse for pressing the refrigerant, and the noise derived from the valve sleet that fail to slide down to block the high-pressure refrigerant from flowing back when the machine is shut down, as well as stabilize the direction of the refrigerant flowing into the high-pressure chamber.

2. Description of the Prior Art

FIG. 1 is structure diagram schematically illustrating a common turbine compressor, and the basic structure of the whole compressor (A) includes a rotating turbine (A2), a fixed turbine (A1), a shielding seat (B) and a driving module; therein, interior airtight space of compressor (A) is separated by the shielding seat (B) into a bottom low-pressure chamber (R1) and an upper high-pressure chamber (R2) with refrigerant inlet (A3) and outlet (A4) on the sides of the chambers respectively, and a fixed turbine (A1) and a rotating turbine (A2) beneath the shielding seat (B) on one side of the low-pressure chamber (R1). Then the rotating turbine (A2) is driven to revolve by the driving module (C) inside the fixed turbine instead of spinning, thereby the volume between the fixed turbine (A1) and the rotating turbine (A2) is altered, and the refrigerant in the low-pressure chamber (R1) is absorbed and compressed to change the volume of refrigerant, thus the high-pressure refrigerant flow into the refrigerant pipe via the outlet (A4) after flowing across the vent hole (B1) of shielding seat (B), and subsequently the refrigerant will exchange heat between the refrigerant pipe and the compressor.

Because the high-pressure end and low-pressure end are located on both sides of the shield seat (B), then the high-pressure gas will flow back to the low-pressure side with noise created when the compressor stops working, it is necessary to set a check valve (B2) at the vent hole (B1) of shielding seat (B) to prevent the high-pressure refrigerant from flowing back quickly to the low-pressure side; however, the common check valve (B2) is in a structure of a valve sheet, which results in high-pressure refrigerant flowing back and noise thus produced in case the sheet actually fails to slide down to block the access when the machine stops working; additionally, FIG. 2 is another check valve structure in the market, whereby the high-pressure refrigerant is prevented from flowing back to the low side by a spool (E) positioned between the shielding seat (B) and the cock cover (D) while the bottom surface of the spool (E) is directly against the end surface of the shielding seat (B). However, when the rotating turbine and the fixed turbine spin mutually, impulse will be produced as the refrigerant is pressed into the high-pressure chamber (R2), then the check valve (B2) bumps up and down with tremendous abnormal noise resulted.

SUMMARY OF THE INVENTION

The present invention of the check valve with silencing cover mainly includes a valve cock and a valve cock cover to form a structure of check valve, of which a trepan boring is set on the cover to accommodate the valve cock, and a pressure guide hole is set on the cover body to connect the high-pressure and valve cock trepan boring. A blast groove is set on the binding surface of the valve cock cover and shielding seat to release refrigerant. The high-pressure refrigerant will directly push the valve cock upward when the rotating turbine and fixed whirl spin mutually, and accordingly the high-pressure refrigerant flows into the high-pressure chamber via the blast groove. When the machine stops working, the valve cock will be directly pressed against the vent hole of the shielding seat under the effect of the high-pressure chamber, hereby the high-pressure refrigerant is blocked from flowing back into the low-pressure chamber.

The other object of the present invention is to form a curve lead angle at the fringe of the vent hole, guiding the release of refrigerant by combining the lead angle and the end surface of the valve cock, and then noise derived from the refrigerant impulse is hereby reduced.

Another object of the present invention is to stabilize the flow direction of the refrigerant flowing into the high-pressure chamber while discharging the refrigerant evenly via the blast groove.

The fourth object of the present invention, improved structure of the check valve of the compressor, is to form an airway on the valve cock cover, then large volume of refrigerant flows into the high-pressure chamber via the airway instead of the blast grove merely hereof, and high-pressure refrigerant is released effectively and quickly.

| | |
|---|---|
| (A) Compressor | |
| (A1) Fixed Turbine | (1) Shielding Seat |
| (A2) Rotating Turbine | (11) Vent Hole |
| (B) Shielding Seat | (12) Curve Lead Angle |
| (B1) Vent Hole | (13) Housing of Valve Cock Cover |
| (B2) Check Valve | (14) Airway |
| (C) Driving Module | (2) Valve Cock |
| (D) Cock Cover | (21) Containing Groove |
| (E) Spool | (3) Valve Cock Cover |
| (R1) Low-pressure Chamber | (31) Trepan Boring of Valve Cock |
| (R2) High-pressure Chamber | (311)Pressure Guide Hole |
| (32) Blast Groove | (4) Elastic Module |

DESCRIPTION OF THE PREFERRED EMBODIMENT

The function of the check valve in the present invention is primarily to enable the vent hole on the shielding seat of the compressor, which makes the refrigerant enter into the high-pressure chamber from the low-pressure chamber, to prevent the one-way flow of the refrigerant and accordingly keep the refrigerant in the high-pressure chamber, which is subsequently released into the refrigerant pipe under a proper flow rate so that the heat is exchanged between the pipe and the compressor.

Figure 1:
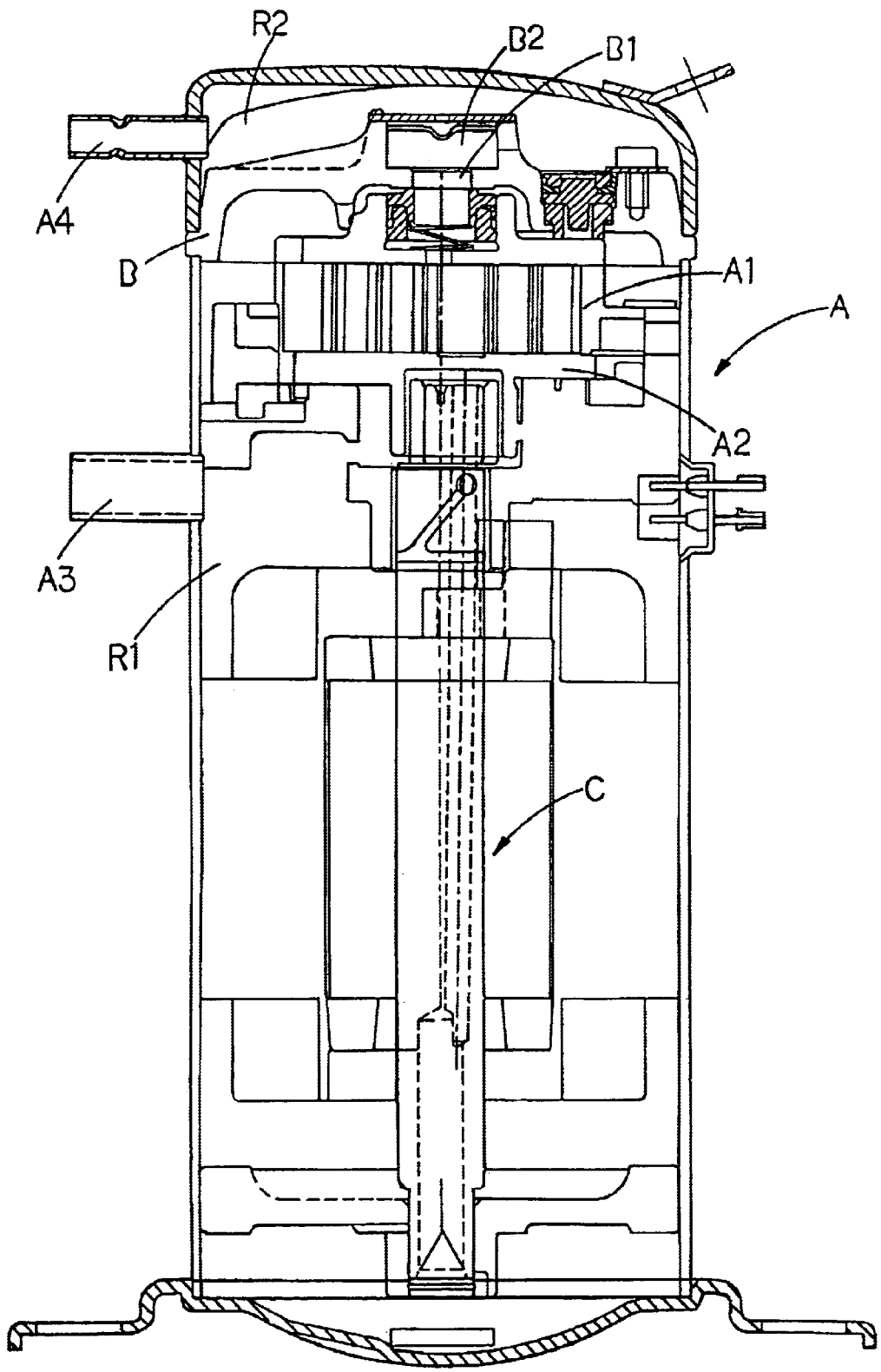
FIG. 1 is structure diagram schematically illustrating the conventional turbine compressor.
Figure 2:
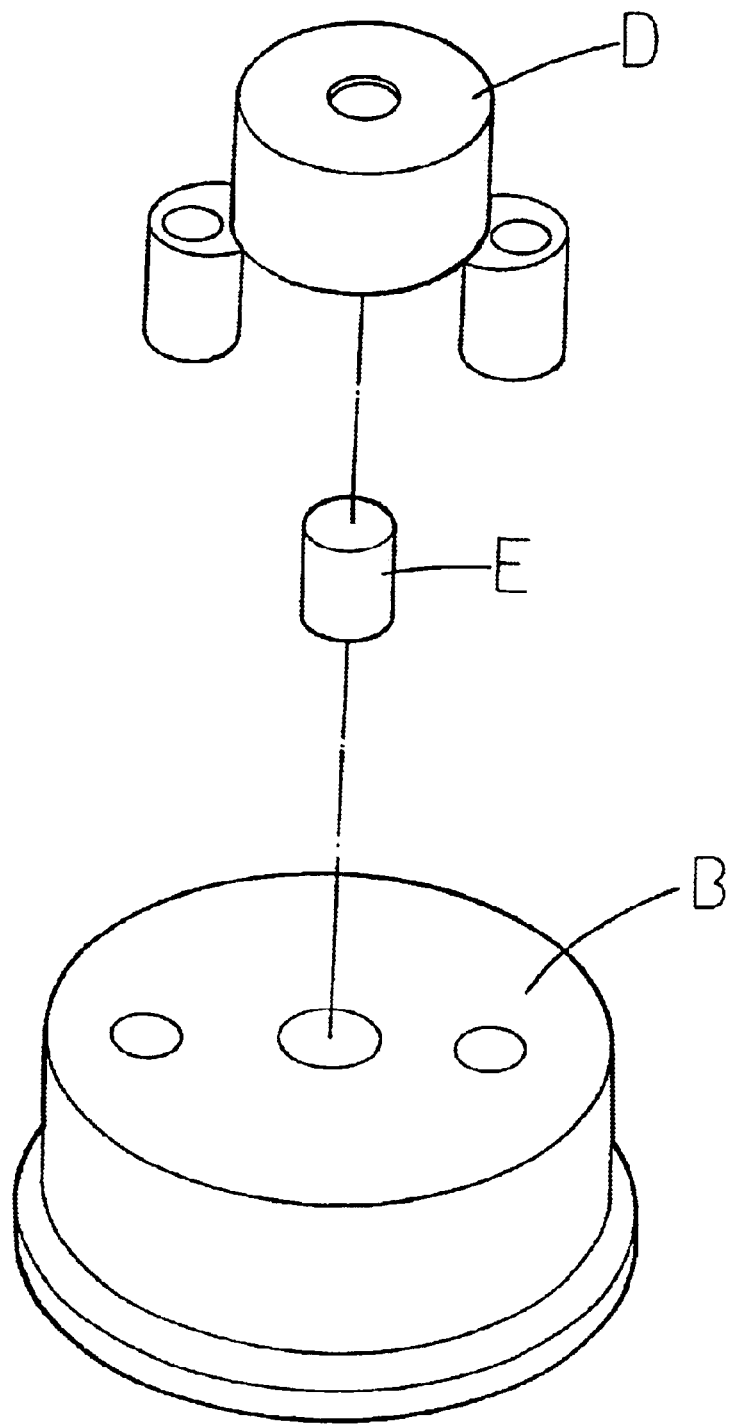
FIG. 2 is an outer structure diagram schematically illustrating the conventional check valve.
Figure 3:
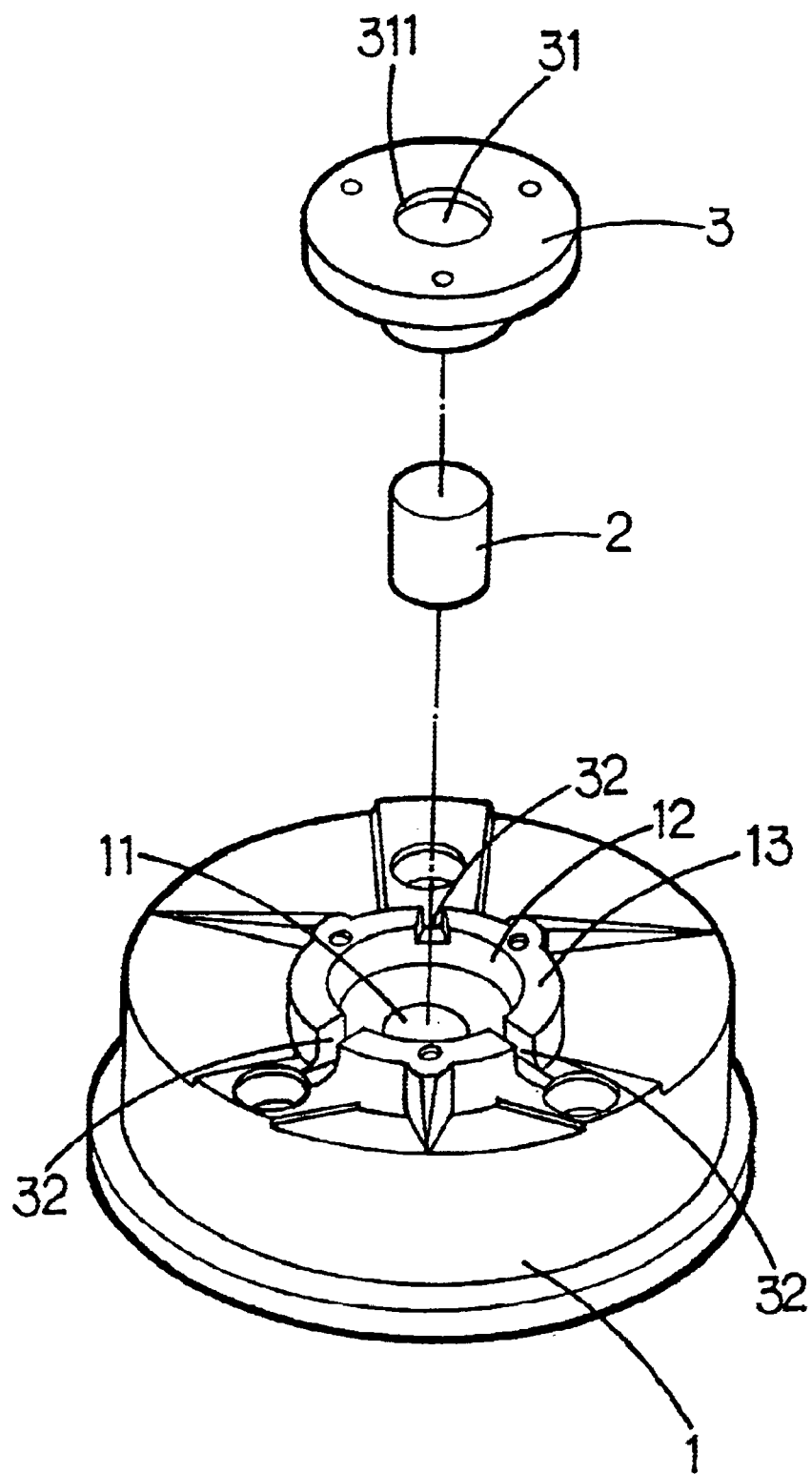
FIG. 3 is an outer structure diagram schematically illustrating the check valve of the present invention.
Figure 4:
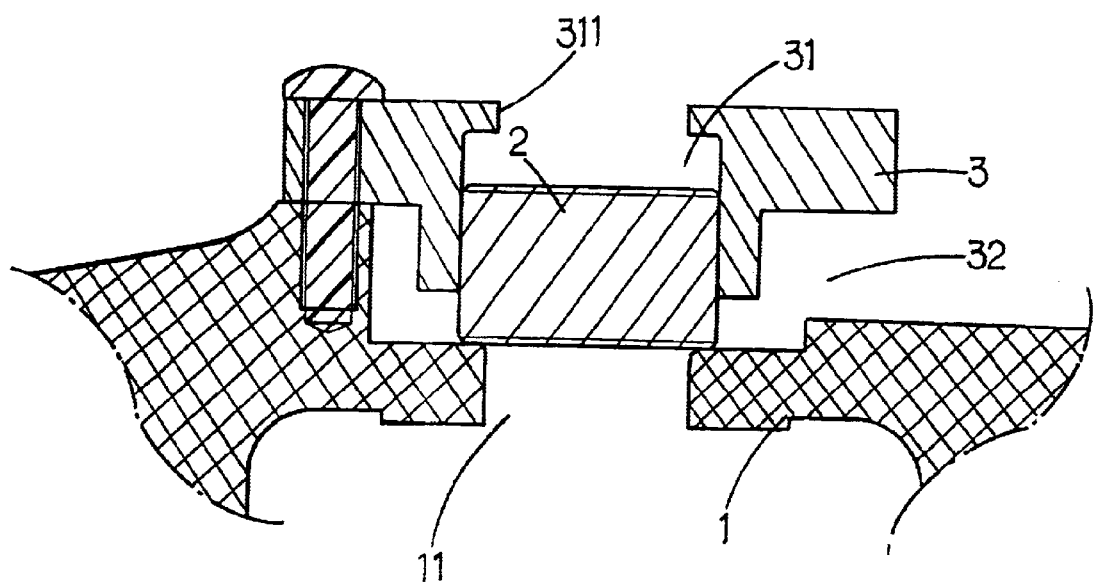
FIG. 4 is a cross-sectional view of the check valve and shielding seat of the present invention.

Referring to FIG. 3 and FIG. 4, the check valve of the present invention is constituted by a valve cock (2) and a valve cock cover (3) cooperating with the main body of a shielding seat (1); thereof the valve cock cover has a valve cock trepan boring (31) to contain the valve cock (2) at the cover body. A press guide hole (311) is set to connect a high-pressure chamber (R2) with the valve cock trepan boring (31) and a blast groove (32) is set at the joint surface of the valve cock cover (3) and the shielding seat (1) to release refrigerant. Under the pressure from the high-pressure chamber (R2), the valve cock (2) will be pushed to the vent hole (11) of the shielding seat (1) to prevent the refrigerant from flowing back to the low-pressure chamber (R1). Whereas when the rotating turbine and the fixed turbine are spinning mutually, the high-pressure refrigerant pushes the valve cock (2) upward, and also flows into the high-pressure chamber (R2) via the blast groove (32). At the fringe of the vent hole (11) of the shielding seat (1), a curved lead angle (12) is formed to guide the release of the refrigerant in cooperation with the end surface of the valve cock (2), so as to reduce the abnormal noise produced as the high-pressure chamber bumps up and down, which results from the impulse caused by the compressed refrigerant flowing into the high-pressure chamber (R2), and guide the direction of the refrigerant into the high-pressure chamber (R2) by evenly releasing the refrigerant via the blast groove (32).

Figure 5:
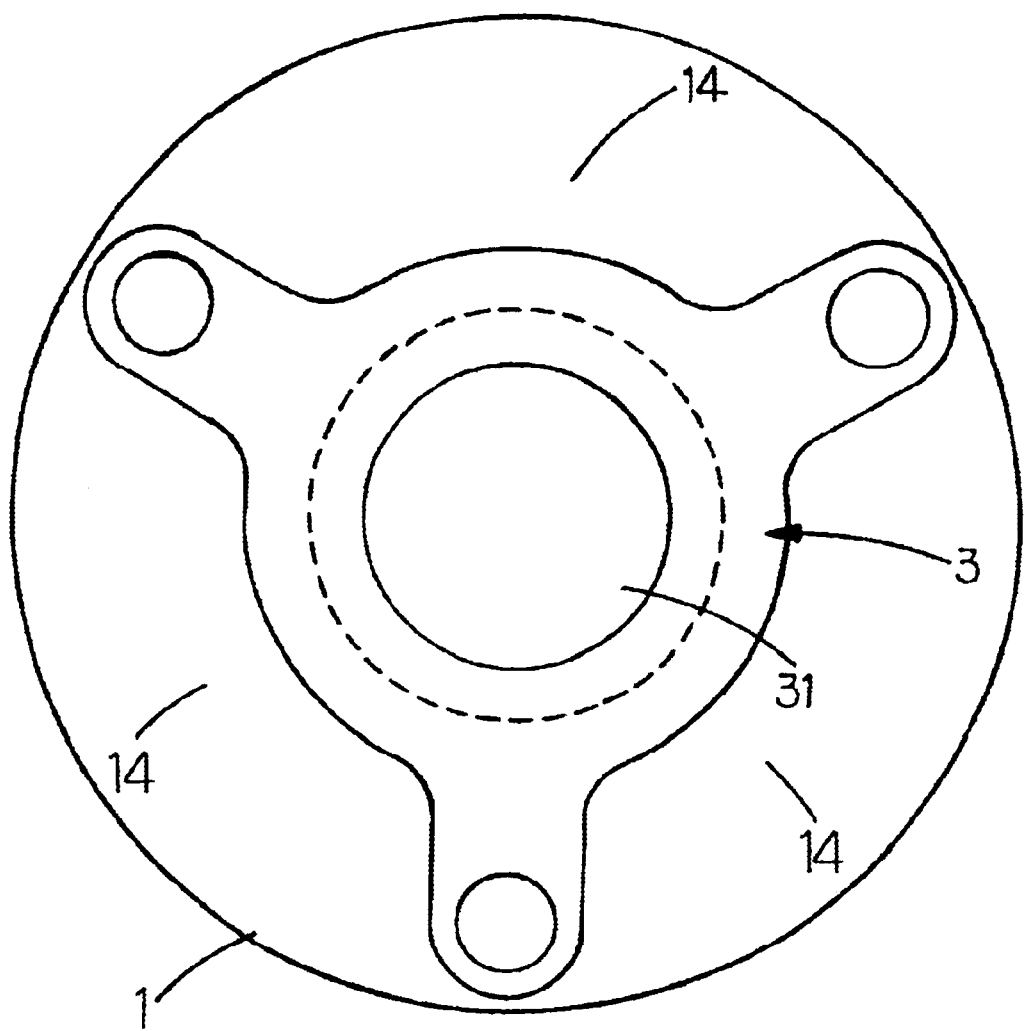
FIG. 5 is a top view schematically illustrating the valve cock cover of the present invention.
Figure 6:
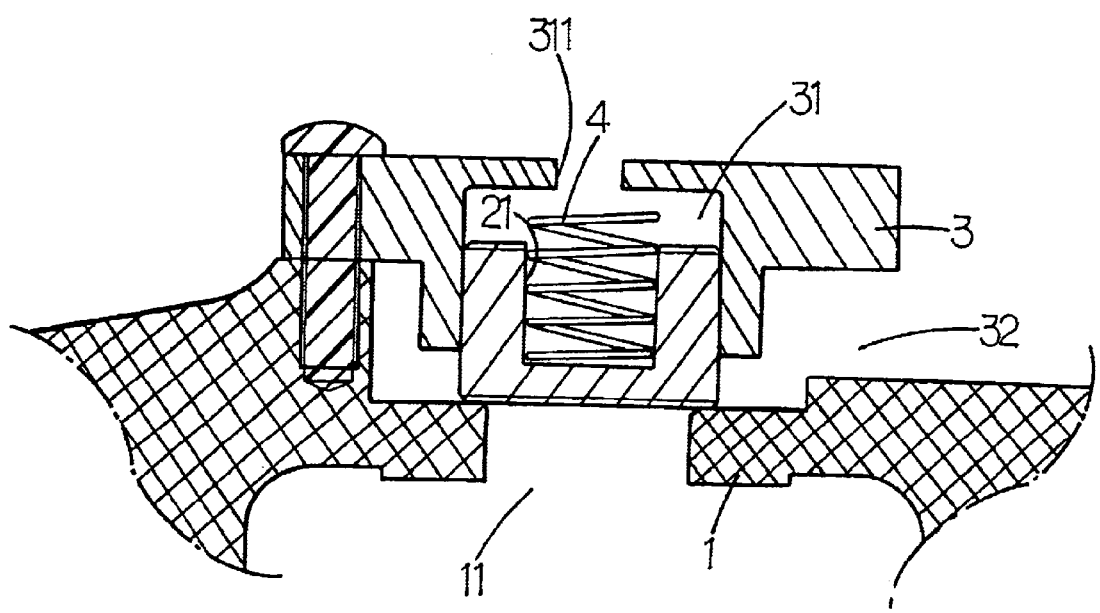
FIG. 6 is a cross-sectional view schematically illustrating the check valve and shielding seat in an exemplary structure.

In addition, at the corner on the surface of the shielding seat (1) of the vent hole (11) is set a housing (13) of valve cock cover used to position the valve cock cover (3) and stabilize the whole structure of the check valve. Certainly the blast groove can be directly set on the wall of the housing (13) of the valve cock cover, and when the valve cock (2) is pushed up by the high-pressure refrigerant, the refrigerant will successfully enter into the high-pressure chamber (A2) through the blast groove (32) under the lead of the curve lead angle (12) on the wall of the housing (13) of valve cock cover. Also as showed in FIG. 5, an airway (14) is set on the valve cock cover, thus when the refrigerant exceeds the load limit of the blast groove (32), it will be stably released into the high-pressure chamber (R2) with the help of the airway (14). As shown in FIG. 6, there is a containing groove (21) at the upside of the valve cock (2), in which is an elastic module (4). When the valve cock (2) is pushed up by large amount of high-pressure refrigerant, the elastic module (4) will act as a buffer to reduce the noise resulting from the striking of the valve cock (2) and the valve cock cover (3) and to increase the service life of the valve cock (2).

Certainly, the fixed turbine may be used as a shielding seat (1). At the center of the fixed turbine there is a vent hole (11), around which is set a housing (13) of the valve cock cover to position the valve cock cover (3).

In the present invention, a check valve structure is constituted by a valve cock and a valve cock cover cooperating with the main body of the shielding seat. With the pressure of the high-pressure chamber, the valve cock is directly pushed to the vent hole of the shielding seat to prevent the refrigerant from flowing back to the low-pressure chamber. When the rotating turbine and the fixed turbine are running one another, they enable the high-pressure refrigerant to directly push up the valve cock to and to enter into the high-pressure chamber through blast groove. The curved lead angle around the vent hole helps the blast groove effectively reduce the noise produced by the striking of refrigerant and stabilizes the direction in which the refrigerant flows into the high-pressure chamber in order to provides the compressor with a feasible alternative check valve structure. Thus we submit the application for a new patent in accordance with the relevant laws.

What is claimed is:

1. A check valve with a silencing structure for one-way movement of a high pressure refrigerant from a low-pressure chamber to a high-pressure chamber comprising:
   a) a shielding seat having a vent hole with a curved lead angle, the vent hole located in the low-pressure chamber;
   b) a valve cock cover connected to the shielding seat and having a valve cock trepan boring and a press guide hole, the press guide hole located in the high-pressure chamber;
   c) at least one blast groove located between the shielding seat and the valve cock cover; and
   d) a valve cock in the valve cock trepan boring and movable between an open position and a closed position, whereby:
      i) in the open position the valve cock is moved into the valve cock trepan boring by the high-pressure refrigerant flowing into the low-pressure chamber, such that refrigerant flows from the low-pressure chamber through the vent hole and the at least one blast groove into the high pressure chamber; and
      ii) in the closed position, when the high-pressure refrigerant flow is stopped, the valve cock is moved out of the valve cock trepan boring to seal against the shielding seat by high-pressure refrigerant in the high-pressure chamber, such that high-pressure refrigerant is prevented from flowing into the low-pressure chamber from the high-pressure chamber.

2. The check valve according to claim 1, wherein the shielding seat has a housing, the at least one blast groove being defined by the housing.

3. The check valve according to claim 1, wherein the valve cock cover includes an airway located adjacent to the shielding seat and stabilizing refrigerant flowing through the blast groove.

4. The check valve according to claim 1, wherein the shielding seat is a fixed turbine.

5. The check valve according to claim 1, wherein the valve cock has a retaining groove and an elastic module inserted into the retaining groove and buffering the valve cock when moving from the closed position to the open position.

6. The check valve according to claim 5, wherein the elastic module is a spring.

* * * * *